(12) United States Patent
Anand et al.

(10) Patent No.: US 11,782,808 B2
(45) Date of Patent: Oct. 10, 2023

(54) CHAOS EXPERIMENT EXECUTION FOR SITE RELIABILITY ENGINEERING

(71) Applicant: Kyndryl, Inc., New York, NY (US)

(72) Inventors: Vishal Anand, Dublin (IE); Ingo Averdunk, Markt Schwaben (DE)

(73) Assignee: Kyndryl, Inc., New York, NY (US)

( * ) Notice: Subject to any disclaimer, the term of this patent is extended or adjusted under 35 U.S.C. 154(b) by 209 days.

(21) Appl. No.: 17/212,825

(22) Filed: Mar. 25, 2021

(65) Prior Publication Data
US 2022/0308972 A1 Sep. 29, 2022

(51) Int. Cl.
| | |
|---|---|
| G06Q 10/00 | (2023.01) |
| G06F 11/26 | (2006.01) |
| G06Q 10/0631 | (2023.01) |
| G06Q 10/0635 | (2023.01) |
| G06Q 10/20 | (2023.01) |

(52) U.S. Cl.
CPC ...... *G06F 11/26* (2013.01); *G06Q 10/063112* (2013.01); *G06Q 10/063118* (2013.01); *G06Q 10/0631* (2013.01); *G06Q 10/0635* (2013.01); *G06Q 10/20* (2013.01)

(58) Field of Classification Search
CPC combination set(s) only.
See application file for complete search history.

(56) References Cited

U.S. PATENT DOCUMENTS

| | | | |
|---|---|---|---|
| 10,747,559 B2 | 8/2020 | Caldwell | |
| 2016/0148850 A1* | 5/2016 | David | G03F 7/70625 355/53 |
| 2017/0061357 A1* | 3/2017 | Dubey | G06Q 10/063112 |
| 2019/0108232 A1* | 4/2019 | Calcaterra | G06F 16/958 |
| 2020/0175439 A1* | 6/2020 | Abu El Ata | G06Q 10/06375 |
| 2020/0210322 A1 | 7/2020 | Sen | |
| 2020/0293946 A1 | 9/2020 | Sachan | |
| 2020/0314243 A1 | 10/2020 | Yokel | |

OTHER PUBLICATIONS

K. A. Torkura, M. I. H. Sukmana, F. Cheng and C. Meinel, "CloudStrike: Chaos Engineering for Security and Resiliency in Cloud Infrastructure," in IEEE Access, vol. 8, pp. 123044-123060, 2020, doi: 10.1109/ACCESS.2020.3007338. (Year: 2020).*

(Continued)

*Primary Examiner* — Matheus Ribeiro Stivaletti
(74) *Attorney, Agent, or Firm* — Dan Housley, Esq.; Kevin P. Radigan, Esq.; Heslin Rothenberg Farley & Mesiti P.C.

(57) ABSTRACT

A system, computer program product, and method are presented for automatically executing chaos experiments on computing resources, applications, and services through automatically establishing and meeting core requirements for each chaos experiment. The method includes receiving a trigger signal configured to establish one or more conditions to execute one or more chaos experiments on at least a portion of one or more landing zones. The one or more chaos experiments are configured to operationally stress one or more of one or more infrastructure resources, one or more services, and one or more computing applications. The method also includes determining, automatically, the technical support coverage for the execution of the one or more chaos experiments. The method further includes executing, automatically, subject to the technical support coverage determination, the one or more chaos experiments.

20 Claims, 9 Drawing Sheets

(56) References Cited

OTHER PUBLICATIONS

A. Basiri, L. Hochstein, N. Jones and H. Tucker, "Automating Chaos Experiments in Production," 2019 IEEE/ACM 41st International Conference on Software Engineering: Software Engineering in Practice (ICSE-SEIP), 2019, pp. 31-40, doi: 10.1109/ICSE-SEIP. 2019.00012. (Year: 2019).*
"Chaos Engineering Concepts in the Chaos Toolkit," Chaos Toolkit, accessed Mar. 25, 2021, 3 pages. <https://docs.chaostoolkit.org/reference/concepts/>.
Andrus, "3 key steps for running chaos engineering experiments," InfoWorld, Apr. 11, 2018, 6 pages. <https://www.infoworld.com/article/3268017/3-key-steps-for-running-chaos-engineering-experiments.html>.
Bocetta, "How to Use Chaos Engineering to Break Things Productively," InfoQ, Sep. 2, 2019, 10 pages. <https://www.infoq.com/articles/chaos-engineering-security-networking/>.
Mehra, "Chaos engineering and testing: 34 tools and tutorials," TechBeacon, accessed Mar. 25, 2021, 10 pages <https://techbeacon.com/app-dev-testing/chaos-engineering-testing-34-tools-tutorials>.
Mell et al., "The NIST Definition of Cloud Computing," Recommendations of the National Institute of Standards and Technology, U.S. Department of Commerce, Special Publication 800-145, Sep. 2011, 7 pages.
Rosenthal et al., "Chaos Engineering," O'Reilly Media, Inc., Aug. 2017, 4 pages <https://www.oreilly.com/library/view/chaos-engineering/9781491988459/>.
Samanta et al., "Carbon to Diamond: An Incident Remediation Assistant System from Site Reliability Engineers' Conversations in Hybrid Cloud Operations," arXiv:2010.05569v1 [cs.CL], Oct. 12, 2020, 7 pages, <https://arxiv.org/pdf/2010.05569.pdf>.

* cited by examiner

*530*

| 532 | Week One | Week Two | Week Three | Week Four |
|---|---|---|---|---|
| SRE1 | Token1 | Token6 | Token11 | Token16 |
| SRE2 | Token2 | Token7 | Token12 | Token17 |
| SRE3 | Token3 | Token8 | Token13 | Token18 |
| SRE4 | Token4 | Token9 | Token14 | Token19 |
| SRE5 | Token5 | Token10 | Token15 | Token20 |

Week One — 540

| | | | Quorum Met |
|---|---|---|---|
| Token1 | Token2 | Token4 | Yes |
| Any | Other | Combination | X |

Week One: 1, 2, 4 — 542

Week Two — 550

| | | | Quorum Met |
|---|---|---|---|
| Token7 | Token8 | Token9 | Yes |
| Any | Other | Combination | X |

Week Two: 7, 8, 9 — 552

Week Three — 560

| | | | Quorum Met |
|---|---|---|---|
| Token13 | Token14 | Token11 | Yes |
| Any | Other | Combination | X |

Week Three: 13, 14, 11 — 562

Week Four — 570

| | | | Quorum Met |
|---|---|---|---|
| Token19 | Token20 | Token16 | Yes |
| Any | Other | Combination | X |

Week Four: 19, 16, 20 — 572

FIG. 5C

CHAOS EXPERIMENT EXECUTION FOR SITE RELIABILITY ENGINEERING

BACKGROUND

The present disclosure relates to site reliability engineering, and, more specifically, to automatically executing chaos experiments on computing resources, applications, and services through automatically establishing and meeting core requirements for each chaos experiment.

At least some known site reliability engineering activities include using site reliability engineers (SREs) to execute chaos engineering-based experiments to test a systems reliability through operationally stressing the respective computing resources and applications in real-time to determine the outer parameters of operational performance and abilities to recover from system failures. However, in at least partial contradiction to the term "chaos," the chaos engineering-based experiments are typically executed under certain constraints given that, unlike simulations, there is at least some risk of inducing at least a partial shutdown of the systems being tested. Therefore, the experiments are typically conducted with SREs that have the appropriate knowledge and experience with the respective hardware resources, software applications, and services to monitor the testing in progress and resolve issues as they arise, and in some cases, recover the system.

SUMMARY

A system, computer program product, and method are provided for automatically executing chaos experiments on computing resources, services, and applications through automatically establishing and meeting core requirements for each chaos experiment.

In one aspect, a computer system is provided for automatically executing chaos experiments on computing resources, services, and applications through automatically establishing and meeting core requirements for each chaos experiment. The system includes one or more processing devices and at least one memory device operably coupled to the one or more processing devices. The one or more processing devices are configured to receive a trigger signal configured to establish one or more conditions to execute one or more chaos experiments on at least a portion of one or more landing zones. The one or more landing zones are configured with one or more of one or more infrastructure resources, one or more services, and one or more computing applications. The one or more chaos experiments are configured to operationally stress the one or more chaos experiments configured to operationally stress the one or more of the one or more infrastructure resources, the one or more services, and the one or more computing applications. The one or more processing devices are also configured to determine, automatically, technical support coverage for the execution of the one or more chaos experiments. The one or more processing devices are further configured to execute, automatically, subject to the technical support coverage determination, the one or more chaos experiments.

In another aspect, a computer program product is provided for automatically executing chaos experiments on computing resources, services, and applications through automatically establishing and meeting core requirements for each chaos experiment. The computer program product includes one or more computer readable storage media, and program instructions collectively stored on the one or more computer storage media. The product also includes program instructions to receive a trigger signal configured to establish one or more conditions to execute one or more chaos experiments on at least a portion of one or more landing zones. The one or more landing zones are configured with one or more of one or more infrastructure resources, one or more services, and one or more computing applications. The one or more chaos experiments are configured to operationally stress the one or more chaos experiments configured to operationally stress the one or more of the one or more infrastructure resources, the one or more services, and the one or more computing applications. The product also includes program instructions to determine, automatically, technical support coverage for the execution of the one or more chaos experiments. The product further includes program instructions to execute, automatically, subject to the technical support coverage determination, the one or more chaos experiments.

In yet another aspect, a computer-implemented method is provided for automatically executing chaos experiments on computing resources, services, and applications through automatically establishing and meeting core requirements for each chaos experiment. The method includes receiving a trigger signal configured to establish one or more conditions to execute one or more chaos experiments on at least a portion of one or more landing zones. The one or more landing zones are configured with one or more of one or more infrastructure resources, one or more services, and one or more computing applications. The one or more chaos experiments are configured to operationally stress the one or more chaos experiments configured to operationally stress the one or more of the one or more infrastructure resources, the one or more services, and the one or more computing applications. The method also includes determining, automatically, the technical support coverage for the execution of the one or more chaos experiments. The method further includes executing, automatically, subject to the technical support coverage determination, the one or more chaos experiments.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIG. 5C is a tabular diagram illustrating an example set of operations of a token unit and a chaos quorum unit resident within the mixer of FIG. 5B, in accordance with some embodiments of the present disclosure.

Figure 1:
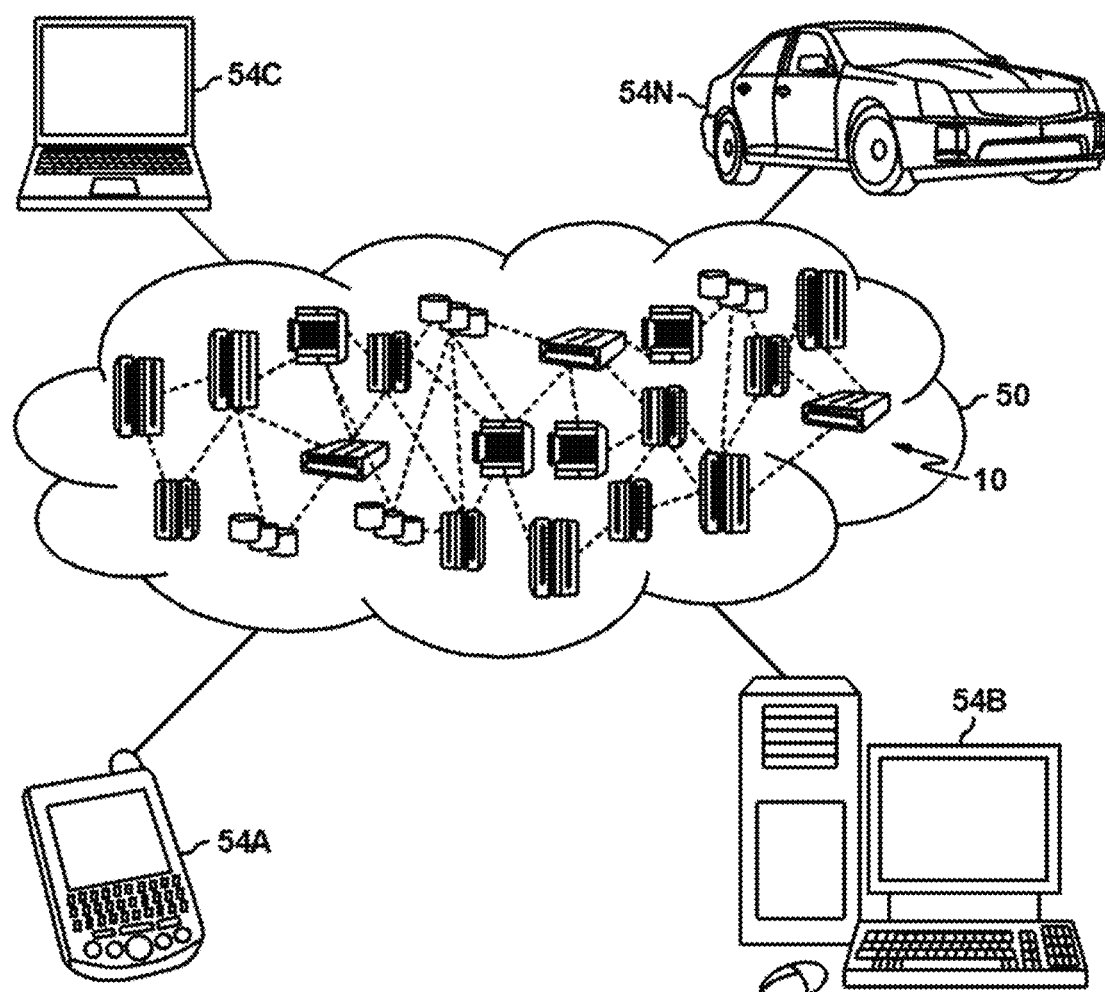
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
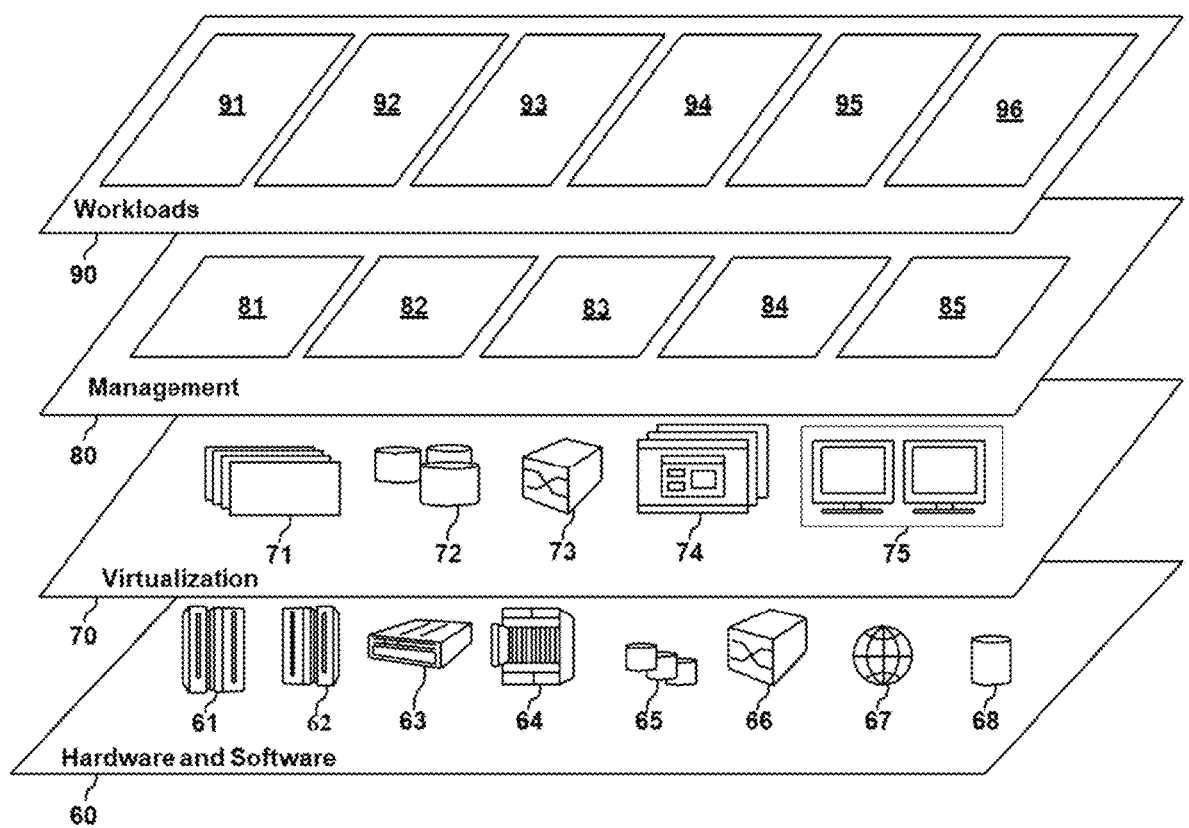
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatically executing chaos experiments on computing resources and applications 96.

Figure 3:
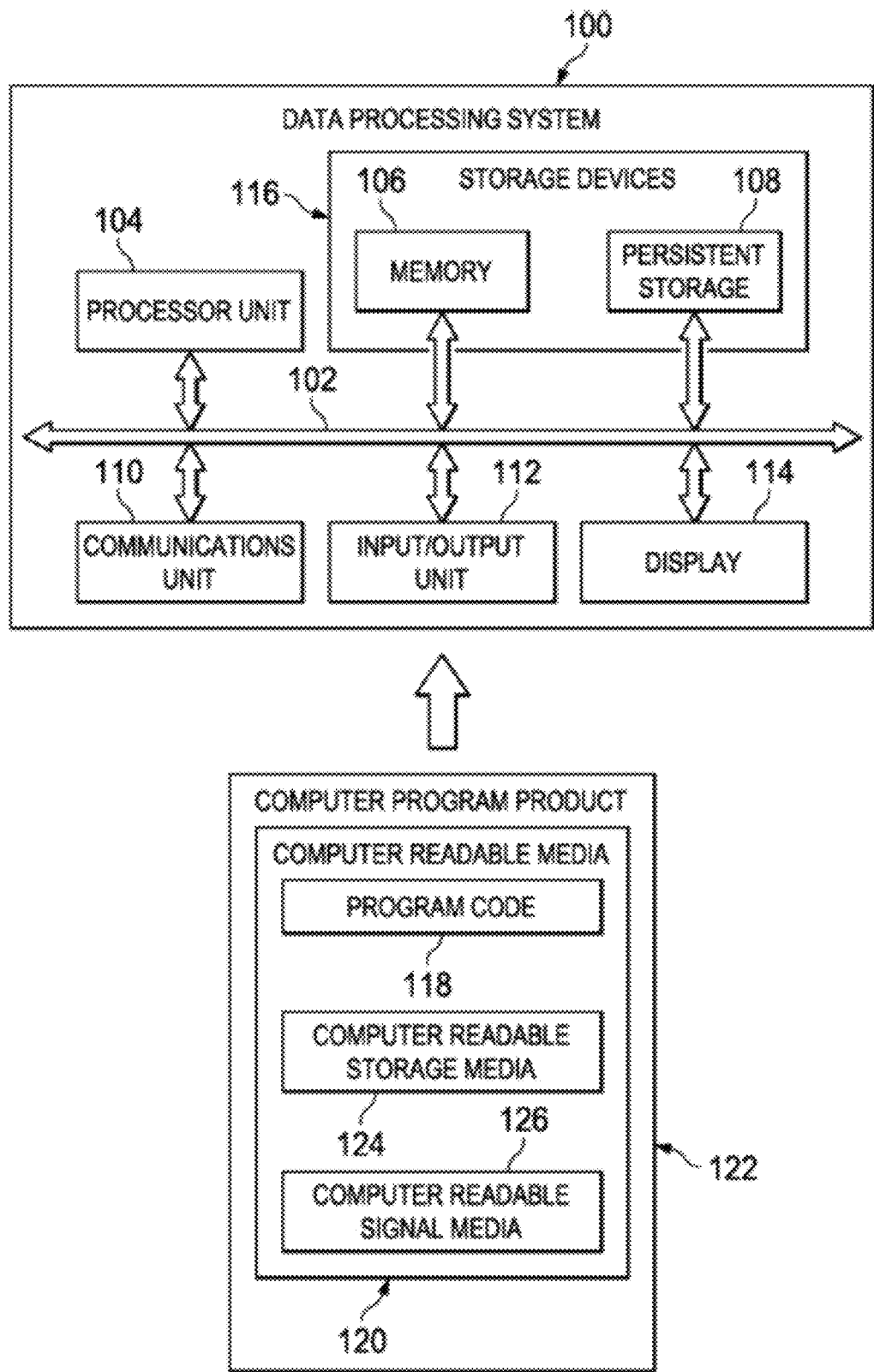
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multiprocessor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Throughout many known information technology disciplines, testing the respective systems hardware and software is typically included in the schedule. Activities that would typically include such testing are, for example, and without limitation, system commissioning, major upgrades, migrations, troubleshooting known failures, and periodic preventive maintenance. Systems may range from on-premises systems to global systems. In at least some cases, a portion of the testing is executed on live systems to determine real-time parameters and performance of the tested systems to determine reliability and availability under conditions that may be relatively extreme. At least some of the testing sequences require utilizing site reliability engineering principles to implement the activities used to execute the tests.

At least some known site reliability engineering activities include using technical support representatives, i.e., site reliability engineers (SREs) to execute chaos engineering-based experiments, herein referred to as "chaos experiments." The chaos experiments are configured to test a system's reliability through operationally stressing the respective computing resources, services, and applications in real-time to determine the outer parameters of operational performance as well as the abilities to recover from system failures. Chaos engineering is the practice of testing a system's response to turbulent behavior, such as infrastructure failures, unresponsive services, or missing components. The goal is to "break the system" to identify and correct deficiencies with respect to a system's architecture, understand its weak points, anticipate specific failures under certain conditions, and determine how the system and the associated personnel might behave under stressed real-time scenarios. Accordingly, chaos experiments are executed on systems in production in order to build confidence in the system's capabilities to withstand turbulent and unexpected conditions and in order to reveal any weaknesses under controlled and monitored test conditions prior to unexpected failures while in production.

However, in at least partial contradiction to the term "chaos," the chaos experiments are typically executed under certain constraints given that, unlike simulations, there is at least some risk of inducing at least a partial shutdown of the systems being tested. The testing sequences require careful planning through explicit hypotheses to anticipate the events that are expected to occur, and as well as events that at least should be anticipated. In many embodiments, the planning results in a test manifest file for each testing sequence. A test manifest file is a file containing metadata for a group of accompanying files that are part of a set or coherent unit that defines a predetermined testing sequence.

In many embodiments, since the inventory of separate testing sequences typically encompasses a broad array of system platform infrastructure devices and interconnected and diverse software applications, the chaos experiments are typically conducted with SREs. The SREs have the appropriate knowledge and experience with the hardware resources, software applications, and services to monitor the testing in progress and resolve issues as they arise, and in some cases, recover the system. The SREs are available at work sites (remote or at one of the system locations) in a specifically-designed shift rotation that is often manually determined through assigning periods where the SREs execute the chaos experiments as per an approved time window. Specific skills are typically required for specific chaos experiments, which means that a number of SREs with the specific skills and historical knowledge of the portions of the system under test will be scheduled for the specified test sequences.

In some known chaos testing operations, known project management methods and/or known electronic support scheduling mechanisms for scheduling the SREs are used. Such known project management methods are often executed manually by a human based on a large amount of data insertion or intuition and knowledge maintained by the project management team. Similarly, many known electronic support scheduling mechanisms are adept at identifying individuals with the necessary skills and knowledge to address a known technical issue. However, many of these known methods typically do not address issues that may arise such as a particular SRE that executes a chaos experiment may not be available in a post-testing time period to address latent issues that have their root causes relating back to when the test was run. Relatedly, when such latent issues arise, an SRE that did not participate in the planning of the chaos experiment or the execution thereof will be the only SRE available, thereby presenting the SRE with a steep learning curve toward issue resolution, in some cases, where the system is out of service in a production environment. In addition, an SRE that plans the chaos experiment may not be available for the scheduled test due to scheduling conflicts, and the test may need to be executed without her present. In some instances, the lack of proper planning and execution may place the SRE on shift, or a previous SRE, in a position to unfairly receive the blame for an outage caused by inadequate technical controls. Accordingly, from an SRE perspective, many known scheduling mechanisms do not provide the technical controls to decide which SRE does what throughout the entire life cycle of the chaos experiments to be planned and executed, which typically results in scheduling conflicts and unnecessary delays that may not be in a customer's or client's best interests.

Moreover, many known project management scheduling applications and known electronic support scheduling mechanisms do not provide the necessary automated technical controls to allow a controlled execution during the chaos experiments. In addition, such applications and mechanisms do not provide the necessary automated technical controls to determine if a particular chaos experiment should be allowed to execute given the present status and historical operations of the system under test. Furthermore, such applications and mechanisms do not provide the necessary automated technical controls with respect to observation of the remaining error budget.

A system, computer program product, and method are disclosed and described herein directed toward automatically executing chaos experiments on computing resources, services, and applications through automatically establishing and meeting core requirements for each chaos experiment. The robust chaos experiment system and method described herein facilitates operation through technology controls for determining which chaos experiments will be executed and when. The system also determines which SRE from the team of SREs that will be on-call and their roles for the respective assigned tests. Such roles may be determined by the system based on the skills and knowledge of the SREs. The system further maintains the details of the planning and executing of previously executed chaos experiments such that appropriate SRE coverage may be maintained for a predetermined period of time after the particular chaos experiment is completed. The system also facilitates identifying those multiple SREs with overlapping or similar skill sets and knowledge that may be jointly updated on the respective chaos experiments. The system further facilitates proper maintenance of the error budget.

The chaos experiment system includes a chaos execution unit that include a chaos engine, where the chaos execution unit is configured to generate a chaos experiment manifest for each chaos experiment and transmits the manifests to a mixer. The mixer uses intelligent features to combine information from the manifests, from a chaos quorum unit, and from a token unit to determine the population of SREs to be available for each chaos experiment. The token unit is configured to generate and assign tokens for each SRE assigned to the SRE testing team based upon experience and knowledge levels. The system also includes an error budget unit to determine whether there is sufficient error budget remaining to provide for recovery actions when deficiencies are found.

In some embodiments, the error budget may be based on factors that include reliability factors such as, and without limitation, availability, latency, and durability. For example, for request/response analyses, an availability factor could be based on a service that should be approximately 99% available where the error budget is temporally-based at approximately 1%. As another example, for request/response analyses, a latency factor could be based on the performance of an application programming interface (API) that should be less than 500 milliseconds (msec) in approximately 99.9% of the cases, where the error budget would be approximately 0.1% of the cases where the response time could be less than 500 msec. In a further example, for storage analyses, a durability factor of a service is based on not losing more than 1 file for every 1,000,000 files, where the error budget would be based on 1 file for every 1,000,000 files stored. In some embodiments, additional factors that may be including in the error budgets include, without limitation, for data processing analyses, coverage, correctness, freshness, and throughput, and for scheduled execution analyses, skew and duration.

Once the chaos execution unit sends a trigger to the mixer, the mixer responds with a decision to execute or not. Once the decision to execute is made, the respective chaos experiment is performed on the respective resources, applications, or services to execute the chaos experiment in the respective landing zone.

Figure 4:
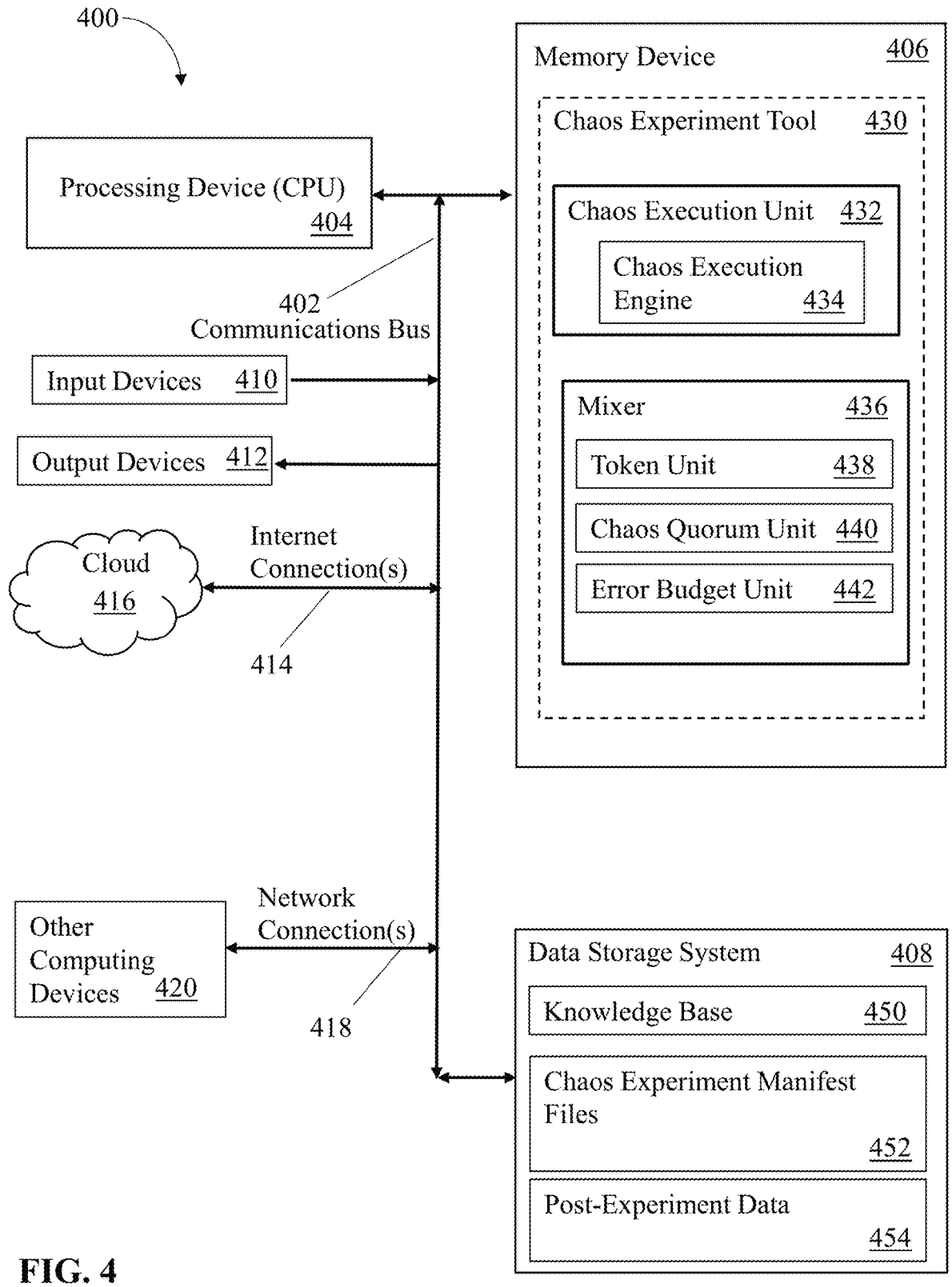
FIG. 4 is a block diagram illustrating an example configuration of a computer system configured for automatically executing chaos experiments on computing resources, applications, and services through automatically establishing and meeting core requirements for each chaos experiment, in accordance with some embodiments of the present disclosure.

Referring to FIG. 4, a block diagram is presented illustrating a computer system, i.e., a chaos experiment system 400 (herein referred to as the system 400) configured to automatically execute chaos experiments on computing resources, applications, and services through automatically establishing and meeting core requirements for each chaos experiment. The system 400 includes one or more processing devices 404 (only one shown) communicatively and operably coupled to one or more memory devices 406 (only one shown). The system 400 also includes a data storage system 408 that is communicatively coupled to the processing device 404 and memory device 406 through a communications bus 402. In one or more embodiments, the communications bus 402, the processing device 404, the memory device 406, and the data storage system 408 are similar to their counterparts shown in FIG. 3, i.e., the communications bus 102, the processing device 104, the system memory 106, and the persistent storage devices 108, respectively. The system 400 further includes one or more input devices 410 and one or more output devices 412 communicatively coupled to the communications bus 402. In addition, the system 400 includes one or more Internet connections 414 (only one shown) to interface with the cloud 416. The system 400 also includes one or more network connections 418 that may be communicatively coupled to other computing devices 420.

In one or more embodiments, a chaos execution tool 430 (herein referred to as the tool 430) is resident within the memory device 406. The tool 430 includes a chaos execution unit 432 with a chaos execution engine 434 embedded therein. The tool 430 also includes a mixer 436 with a token unit 438, a chaos quorum unit 440, and an error budget unit 442 resident therein. These units will be discussed further respect to FIGS. 5A-6B. A knowledge base 450 is maintained in the data storage system 408 for access by the processing device 404 and the memory device 406. In some embodiments, the knowledge base 450 includes information necessary to generate chaos experiment manifest files 452 that are stored in the data storage system 408. The knowledge base 450 may also include the skills and knowledge data for each SRE on the team. In addition, the knowledge base 450 maintains post-experiment data 454 that may be used in the event a latent issue arrives subsequent to a test previously executed.

Figure 5A:
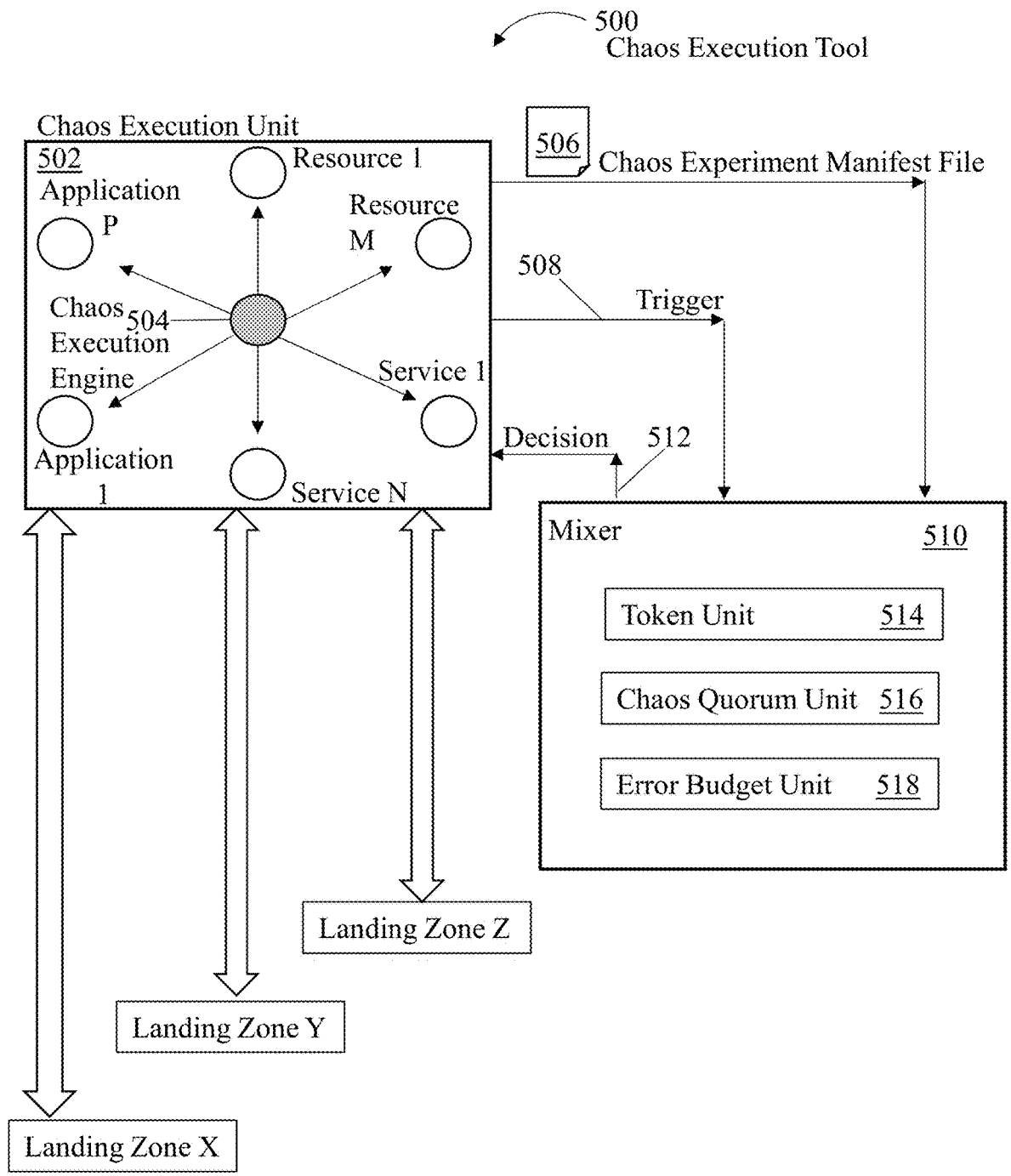
FIG. 5A is a block diagram illustrating a chaos execution tool resident within the computer system of FIG. 4 configured for automatically executing chaos experiments on computing resources, applications, and services through automatically establishing and meeting core requirements for each chaos experiment, in accordance with some embodiments of the present disclosure.

Referring to FIG. 5A, a block diagram is provided illustrating a chaos execution tool 500 (shown as 430 in FIG. 4) resident within the system 400 of FIG. 4 configured for automatically executing chaos experiments on computing resources, applications, and services through automatically establishing and meeting core requirements for each chaos experiment. Also referring to FIG. 4, the tool 500 includes a chaos execution unit 502. The chaos execution unit 502 is configured to generate and execute the respective chaos experiments for objects such as, and without limitation, infrastructure resources 1 through M, services 1 through N, and applications 1 through P. Such objects may be found in the landing zones X, Y, and Z, where three landing zones is non-limiting. As used herein, a landing zone is a scalable, secure, multi-account, cloud-based computing environment that includes an architecture that is a configured environment with a set of secured cloud infrastructure, policies, best practices, guidelines, and centrally managed services. Landing zones provide a pre-configured environment, provisioned through code, to host workloads in private, hybrid, and public clouds within which users may quickly launch and deploy workloads and applications with confidence in the security and infrastructure environment. Landing zones facilitate standardizing cloud environments that may offer consistency across multiple tenants with respect to the respective computing environments. For example, and without limitation, any combination of infrastructure resources 1 through M, services 1 through N, and applications 1 through P may be found in the landing zones X, Y, and Z. Landing zones may include, without limitation, SaaS, IaaS, and PaaS (as described herein), as well as containers (e.g., isolated user space instances) and Kubernetes (an open-source container-orchestration system for automating application deployment, scaling, and management). Accordingly, the chaos execution unit 502 includes the data in the knowledge base 450 pertaining to the technical details of the design, construction, and implementation of the respective infrastructure resources 1-M, the services 1-N, and the applications 1-P in each of the landing zones X, Y, and Z.

In one or more embodiments, the chaos execution unit 502 maintains access to the details with respect to the chaos experiments for each landing zone X, Y, and Z that is resident in the data storage system 408, including the knowledge base 450, the chaos experiment manifest files 452, and the post-experiment data 454 (all discussed further herein). The chaos execution engine 504 (shown as 434 in FIG. 4) is resident within the chaos execution unit 502 and provides the operational functionality necessary to execute the chaos experiments on the respective landing zones X, Y, and Z.

In at least some embodiments, the chaos execution engine 504 is configured to facilitate each chaos experiment that is to be executed to provide the SREs skills and knowledge in a declarative manner (as discussed further herein). The chaos execution unit 502 is configured to generate a chaos experiment manifest file 506 (herein manifest file 506) (shown as 452 in FIG. 4) for each chaos experiment that is to be executed, where each manifest file 506 includes the technical details of the test including, without limitation, the resource(s), the service(s), and the application(s) to be tested, the date(s), time(s), and duration(s) of the testing, the skills and knowledge requirements for the attendant SRE(s) for each stage of the testing, and the step-by-step details of the execution activities, as well as potential points of failure. The manifest file 506 also includes an error budget allocated for the respective chaos experiments (discussed further herein). Moreover, the manifest file 506 includes the dependent resource(s), service(s), and application(s) that may be affected by each chaos experiment, and the cited dependencies facilitate not scheduling overlapping tests at the same time.

In one or more embodiments, the chaos execution engine 504 is configured to transmit a trigger signal 508, herein trigger 508, to initiate actions by a mixer 510 that will result in a decision signal 512, herein decision 512 being transmitted from the mixer 510 to the chaos execution engine 504 as to whether the test will be allowed to run or not. The mixer 510 is described further herein.

In some embodiments, the mixer 510 (referred to as 436 in FIG. 4) is communicatively and operably coupled to the chaos execution unit 502. Also, in some embodiments, the mixer 510 includes any combination of circuitry and code that enables operation of the mixer 510 as described herein as an intelligent logical unit. For example, the mixer 510 includes sufficient algorithmic logic to determine the rotation schedule of the SREs based on the technical requirement presented in the manifest file 506 and associated tokens (discussed further herein). The mixer 510 includes sufficient algorithmic logic to determine if a quorum of SREs is met (discussed further herein), and if so, the mixer 510 determines if sufficient error budget is available for the test. If the SRE rotation and tokens are satisfactory, the quorum is met, and sufficient error budget is available, the mixer 510 generates and transmits the "yes" decision 512 to the chaos execution unit 502 to execute the respective chaos experiment. If any of those three logical requirements of the algorithm are not met, the mixer 510 generates and transmits a "no" decision 512 to the chaos execution unit 502 to not execute the respective chaos experiment. Accordingly, the mixer 510 determines how a chaos experiment should be executed, who should execute it, what method of executing it will be used, and what should be the validations before it gets executed.

In embodiments, the mixer 510 includes components that include, without limitation, the token unit 514, the chaos quorum unit 516, and the error budget unit 518 (shown as 438, 440, and 442 in FIG. 4, respectively). The mixer 510 is described further with respect to FIG. 5B.

Figure 5B:
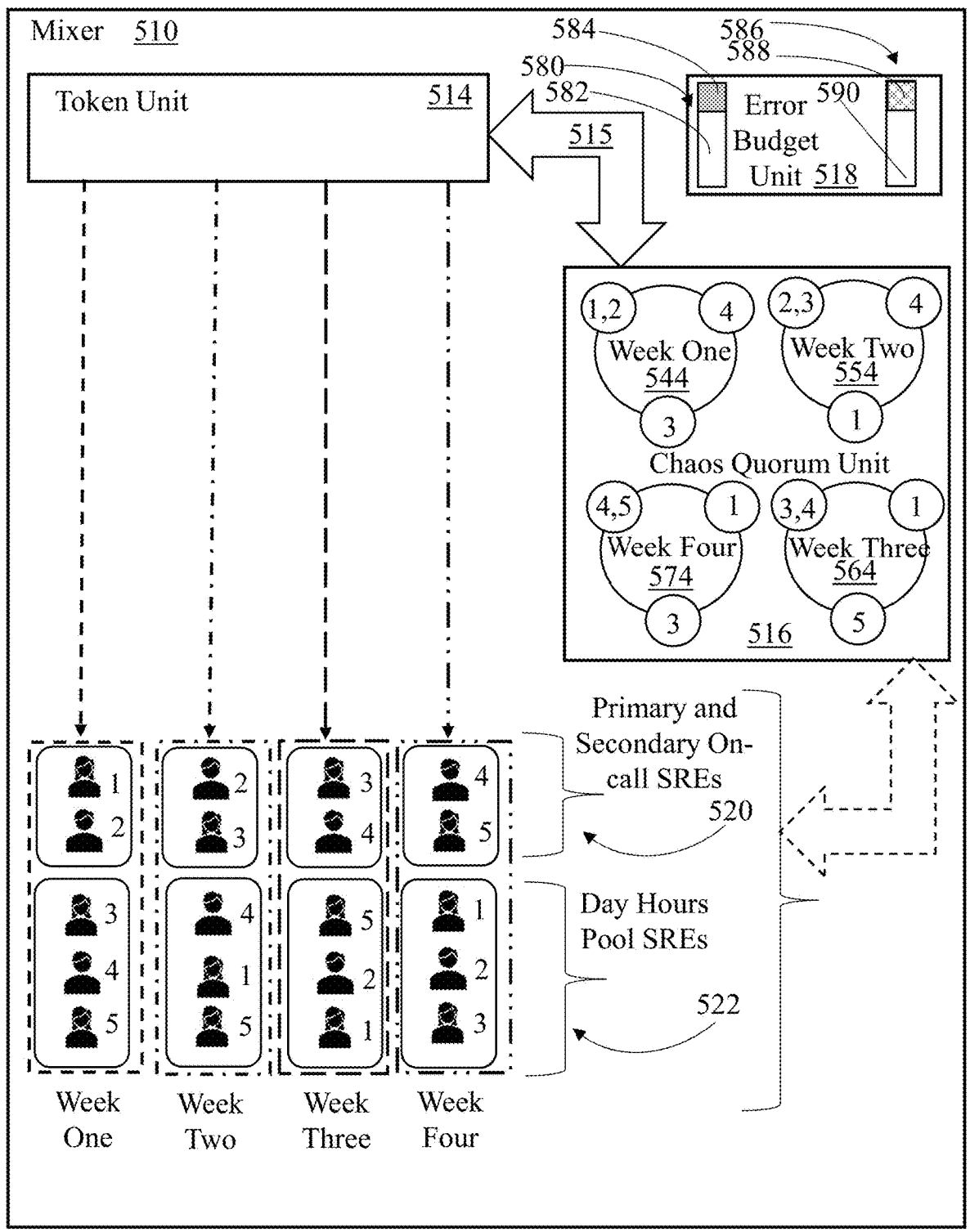
FIG. 5B is a block diagram illustrating further definition of a mixer resident within the chaos execution tool shown in FIG. 5A, in accordance with some embodiments of the present disclosure.

Referring to FIG. 5B, a block diagram is provided illustrating further definition of the mixer 510 resident within the chaos execution tool 500 shown in FIG. 5A. In addition, referring to FIG. 5C, a tabular diagram illustrating an example set of operations 530 of the token unit 514 and the chaos quorum unit 516 resident within the mixer 510 of FIG. 5B is provided. The token unit 514 and the chaos quorum unit 516 cooperate to identify and assign the SREs with the skills and knowledge to support the chaos experiments under consideration.

As shown in FIGS. 5B and 5C, there are five SREs on the team for the example discussed herein, where the number five is non-limiting. In at least one embodiment, the team includes a SRE1, SRE2, SRE3, SRE4, and SRE5 that have been selected from a larger pool of SREs based on their skill sets and knowledge with respect to the pending chaos experiments and the particular resources, services, and applications for the respective landing zones. In some embodiments, the requirements for the SREs may be embedded within the manifest file 506. In the example embodiment, the scheduled time frame for conducting a full suite of chaos experiments for a particular landing zone is four weeks. The five SREs are shown as rotating between primary and secondary on-call SREs 520 and three of day hours pool SREs 522. The SREs may all be remote; however, an on-premises presence is also possible. The day hours pool SREs 522 provide an availability for broader support for issue resolution through, for example, and without limitation, typical business hours of 9 AM through 5 PM.

As previously discussed, prior to the assignments to the schedule as either the primary and secondary on-call SREs 520 and day hours pool SREs 522, in some embodiments, the selection is based on one or more selection criteria that includes, without limitation, skills and knowledge with respect to the landing zone, overall experience level as an on-call SRE, and knowledge of previous tests performed on this landing zone. In some embodiments, such knowledge of previous chaos experiments being performed on the respective landing zone is saved as data in the post-experiment data 454. In some embodiments, the factors are weighted and assigned numerical values to determine an overall score. In some embodiments, a minimum score threshold value must be attained to get on the team.

In embodiments, the token unit 514 is configured to generate the tokens and assign each of the respective tokens to each SRE of the team of SREs and the chaos quorum unit 516 assigns the tokens to particular slots in the SRE schedule rotation based on when the skill sets are needed. Accordingly, the token unit 514 and the chaos quorum unit 516 are closely integrated in a communicative and operative coupling as indicated by the arrow 515 to provide the SRE personnel for the pending chaos testing.

The token unit 514 is configured to generate tokens for each SRE assigned to the SRE testing team. The token unit 514 is configured to first determine if each SRE on the team has been evaluated as previously described. If the evaluation for the respective SRE is completed, a token is generated that will be used as described further herein with respect to the token unit 514 and the chaos quorum unit 516. If the respective SRE did not meet the requirements through the token unit 514, the respective SRE will not be assigned any tokens for the portions of the testing that they did not qualify for. For those generated tokens, the token unit 514 assigns the tokens to the appropriate SREs.

Referring to FIG. 5C, a tabular diagram is provided illustrating an example operation 530 of the token generation and assignment process as executed by the token unit 514. The operation 530 of the token unit 514 generates a token for each of the five SREs for each week of on-call assignment. As shown in a table 532, the SRE1 has been assigned Token1 for Week One, Token6 for Week Two, Token11 for Week Three, and Token16 for Week Four. Similar token generation and assignments for SRE2 through SRE5 are also performed and are illustrated in the table 532. The tokens are representative of the previous analyses by the token unit 514 for determining the best fit of the available SREs that are skilled and knowledgeable with respect to the landing zone and the chaos experiments to be executed thereon. The neat arrangement of the 20 tokens among the five SREs for the four weeks of testing in the first table 532 is merely for ease of discussion. The weekly assignments of the five SREs is also shown in FIG. 5B as a result of the operations performed by the token unit 514.

In some embodiments, once the tokens are assigned to the SREs, the chaos quorum unit 516 generates the SRE coverage for each week. In at least some of such embodiments, the algorithmic logic exercised by the chaos quorum unit 516 includes providing for a weekly rotation of the primary and secondary on call SREs 520, where the secondary on call SRE of the previous Week (n−1) must be the primary SRE of the present Week (n). In addition, the algorithmic logic exercised by the chaos quorum unit 516 includes providing for determining at least one SRE from the day hours pool 522, where at least one SRE from the day hours pool from the previous Week (n−1) must join the day hours pool of the present Week (n), and at least one SRE from day hours pool from the previous Week (n−1) must be the secondary on-call SRE of the presenting Week (n).

Referring to FIG. 5C, as shown in a table 540 for the Week One, the Token1, Token2, and Token4 are determined to provide the quorum, i.e., the minimal coverage determined through the algorithmic logic of the token unit 514. A pictorial representation 542 of the SRE coverage as a function of the Token1, Token2, and Token4 for Week One is shown. The minimal requirements as determined through the algorithmic logic for the quorum for this period of time are met and any other minimal combinations will not suffice. Referring to FIG. 5B, a similar Week One pictorial representation 544 of the SRE coverage within the chaos quorum unit 516 shows the minimal combination of the SRE1 and SRE2 as the primary and secondary on-call SREs 520, respectively, and the SRE3 as the day hours pool SRE 522. Notably, the chaos quorum unit 516 added the SRE3 as another day hours pool SRE 522 for additional coverage. Also, the representation 544 differs from the representation 542 in that the representation 542 shows the assigned tokens and the representation 544 shows the assigned SREs, which is more practical for showing the coverage for the respective period. Further, the algorithmic logic for the chaos quorum unit 516 determines a basement or minimal configuration of the assigned SRE coverage, but places no restrictions on exceeding the basement or minimal SRE coverage requirements. Notably, the algorithmic logic using the SRE assignments for the previous week are not relevant for the first week.

Referring again to FIG. 5C, as s shown in a table 550 for the Week Two, the Token7, Token8, and Token9 are determined to provide the quorum, i.e., the minimal coverage determined through the algorithmic logic of the chaos quorum unit 516. A pictorial representation 552 of the SRE coverage as a function of the Token7, Token8, and Token9 for Week Two is shown. The minimal requirements as determined through the algorithmic logic for the quorum for this period of time are met and any other minimal combinations will not suffice. Referring to FIG. 5B, a similar Week Two pictorial representation 554 of the SRE coverage shows the minimal combination of the SRE2 and SRE3 as the primary and secondary on-call SREs 520, respectively, and the SRE4 as the day hours pool SRE 522. The algorithmic logic requirement of the weekly rotation of the primary and secondary on-call SREs 520 where the secondary on-call SRE of Week One (SRE2) is the primary SRE of Week Two is met. In addition, the algorithmic logic requirement of at least one SRE (SRE4) from the day hours pool from the previous Week One must join the day hours pool of the following Week Two is met. Furthermore, the algorithmic logic requirement of at least one SRE (SRE3) from the day hours pool from the previous Week One must be the secondary on-call SRE of the following Week Two is met. Notably, the chaos quorum unit 516 added the SRE1 as another day hours pool SRE 522 for additional coverage, where such an assignment further strengthens the on-call knowledge of the activities from Week One in Week Two.

Referring again to FIG. 5C, as shown in a table 560 for the Week Three, the Token13, Token14, and Token11 are determined to provide the quorum, i.e., the minimal coverage determined through the algorithmic logic of the chaos quorum unit 516. A pictorial representation 562 of the SRE coverage as a function of the Token13, Token14, and Token11 for Week Three is shown. The minimal requirements as determined through the algorithmic logic for the quorum for this period of time are met and any other minimal combinations will not suffice. Referring to FIG. 5B, a similar Week Three pictorial representation 564 of the SRE coverage shows the minimal combination of the SRE3 and SRE4 as the primary and secondary on-call SREs 520, respectively, and the SRE1 as the day hours pool SRE 522. The algorithmic logic requirement of the weekly rotation of the primary and secondary on-call SREs 520 where the secondary on-call SRE of Week Two (SRE3) is the primary SRE of Week Three is met. In addition, the algorithmic logic requirement of at least one SRE (SRE1) from the day hours pool from the previous Week Two must join the day hours pool of the following Week Three is met. Furthermore, the algorithmic logic requirement of at least one SRE (SRE4) from the day hours pool from the previous Week Two must be the secondary on-call SRE of the following Week Three is met. Notably, the chaos quorum unit 516 added the SRE5 as another day hours pool SRE 522 for additional coverage.

Referring again to FIG. 5C, as shown in a table 570 for the Week Four, the Token19, Token20, and Token16 are determined to provide the quorum, i.e., the minimal coverage determined through the algorithmic logic of the chaos quorum unit 516. A pictorial representation 572 of the SRE coverage as a function of the Token19, Token20, and Token16 for Week Four is shown. The minimal requirements as determined through the algorithmic logic for the quorum for this period of time are met and any other minimal combinations will not suffice. Referring to FIG. 5B, a similar Week Four pictorial representation 574 of the SRE coverage shows the minimal combination of the SRE4 and SRE5 as the primary and secondary on-call SREs 520, respectively, and the SRE1 as the day hours pool SRE 522. The algorithmic logic requirement of the weekly rotation of the primary and secondary on-call SREs 520 where the secondary on-call SRE of Week Three (SRE4) is the primary SRE of Week Four is met. In addition, the algorithmic logic requirement of at least one SRE (SRE1) from the day hours pool from the previous Week Three must join the day hours pool of the following Week Four is met. Furthermore, the algorithmic logic requirement of at least one SRE (SRE5) from the day hours pool from the previous Week Three must be the secondary on-call SRE of the following Week Three is met. Notably, the chaos quorum unit 516 added the SRE3 as another day hours pool SRE 522 for additional coverage, where such an assignment further strengthens the on-call knowledge of the activities from Week Three in Week Four.

The example operation 530 may be adapted to daily and hourly rotation as necessary. In addition, the logic may be adapted to account for SREs joining the team and leaving the team as such events occur in real-time. Moreover, the chaos experiment tool 500 is adaptable to changes in the schedule due to unforeseen events, such as extended troubleshooting for stubborn and persistent issues that may arise, changes to the SRE population that negate attainment of a quorum, etc. In some embodiments, resource leveling features are employed to not overtask any one SRE.

As described herein, the chaos execution tool 500 leverages intelligence logical analyses to identify the skills and knowledge of the SREs in a cognitive manner by being aware of the content of each pending chaos experiment to be executed on the respective landing zones. The token unit 514 resident within the mixer 510 issues tokens only to the relevant SREs and the chaos quorum unit 516 also resident within the mixer 510 provides the schedule assignments to the SREs. More specifically, as shown in FIG. 5B, for the testing activities planned for Week One, the SRE1 is the primary on-call SRE, the SRE2 is the secondary on-call SRE, and the SRE3, SRE4, and SRE5 are the day hours pool SREs, where as shown in the pictorial representation 544, the SRE3 and the SRE4 are definitively scheduled. Similarly, for the testing activities planned for Week Two, the SRE2 is the primary on-call SRE, the SRE3 is the secondary on-call SRE, and the SRE4, SRE1, and SRE5 are the day hours pool SREs, where as shown in the pictorial representation 554, the SRE1 and the SRE4 are definitively scheduled. For the testing activities planned for Week Three, the SRE3 is the primary on-call SRE, the SRE4 is the secondary on-call SRE, and the SRE5, SRE2, and SRE1 are the day hours pool SREs, where as shown in the pictorial representation 564, the SRE1 and the SRE5 are definitively scheduled. For the testing activities planned for Week Four, the SRE4 is the primary on-call SRE, the SRE5 is the secondary on-call SRE, and the SRE1, SRE2, and SRE3 are the day hours pool SREs, where as shown in the pictorial representation 574, the SRE1 and the SRE3 are definitively scheduled. The breakdown of the scheduled chaos experiments to weekly increments is not limiting, and any incremental scheduling may be used, including hours and days.

Accordingly, the chaos execution tool 500 automatically determines the technical requirements for conducting the chaos experiments, the SREs that meet those requirements, and schedules the appropriate SREs to the appropriate slots during the respective chaos experiments that provides satisfactory coverage, where requirements for at least a portion of the presently on-call SREs to have been involved with previous testing are met. Therefore, the most appropriate SREs are automatically placed on call. Those SREs that do not possess the appropriate token are not scheduled for the pending testing.

Referring again to FIG. 5B, the mixer 510 also includes an error budget unit 518 that is configured to validate the error budget for the specific chaos experiment. As previously discussed, the purpose of the chaos experiments is to "break" the system while the system is in production. Therefore, there are on-call SREs with the knowledge and the skills to recover the system as quickly, efficiently, and effectively as possible. However, as part of the planning process for the execution of the chaos experiments, the chaos execution tool 500 also automatically evaluates the risk of each test and determines one or more worst case scenarios for each test and the amount of recovery resources that will be budgeted for the recoveries, where the recovery budget may be in temporal units related to either man-hours of SRE time allotted or production down time for the system, or currency, and in some embodiments, both. The error budget may be included in the manifest file 506 for each respective chaos experiment test. In general, from a client-based perspective, the lost time in production may be the most important feature to budget for. In some embodiments, the error and recovery budgets may be established on a test-by-test basis. In some embodiments, the error and recovery budgets may be established on a weekly basis. In some embodiments, the error and recovery budgets may be established for the entire suite of chaos experiments for the particular system. Accordingly, the error budget unit 518 tracks the amount of error budget allotted, the error budget used, and the error budget remaining.

The error budget values may be dynamically updated as conditions change, e.g., budgeted downtime hours for the system are used in recoveries, tests are performed with no detrimental effects to the system and no error budget is used, the SRE coverage changes and more or less adept SREs are now assigned through the token process described herein, or new tests are added or existing tests are removed from the schedule. The error budget values are also established based on inputs from the chaos execution unit 502, e.g., and without limitation, the resource, service, or application being tested and the expected duration of the test. The amount of remaining error budget is reviewed by the error budget unit 518, and if a particular test does not have sufficient error budget remaining prior to initiating the test to meet a threshold requirement, then the test may not be allowed to be executed. Accordingly, the chaos experiment tool 500 may automatically allow or prevent the execution of certain chaos experiments due to sufficient or insufficient, respectively, error budget remaining.

As shown in FIG. 5B, an error budget icon 580 emulates the budget used 582 and the budget remaining 584. In some embodiments, the budget remaining 584 is colored green. For example, a total test budget may include a 99% operational availability with a 1% non-availability for the error budget. As the error budget is used through operational non-availability, the error budget remaining 584 decreases in size as the error budget used 582 increases. In some embodiments, the error budget icon 586 (that is the error budget icon 580 after a period of time has elapsed) emulates the entire error budget is used through the budget used portion 590. In some embodiments, the portion 588 of the error budget icon 586 is colored red to indicate the error budget has been exhausted.

The error budget unit 518 includes algorithmic logic embedded therein. For example, in some embodiments, if there is sufficient remaining or available error budget, then a condition is met and a decision 512 to execute the chaos experiment may be transmitted to the chaos execution unit 502. In some embodiments, if insufficient error budget remains, then a condition is not met and a decision 512 to execute the respective chaos experiments will be withheld, thereby preventing the execution of the tests. In some embodiments, additional algorithmic logic for the error budget includes determining if a particular chaos experiment execution time is less than or equal to the error budget, then a decision 512 may be transmitted to execute the test since the risk of using the error budget is relatively low. Also, in some embodiments, the respective error budgets are only approved for a predetermined period of time, e.g., and without limitation, one week. Under such circumstances, a decision 512 to execute a test budgeted for a particular time frame will likely not be forthcoming outside of the established temporal window.

Returning to FIG. 5A, the token generation and assignment to the SREs through the token unit 514, the assignment of the SREs to the test schedule rotation by the chaos quorum unit 516, and the error budget determinations by the error budget unit 518, are initiated by the trigger 508 transmitted to the mixer 510 from the chaos execution unit 502. If the requirements to perform the aforementioned functions are completed with an appropriate satisfactory response for each, the mixer 510 will transmit a "yes" decision 512 to the chaos execution unit 502. The chaos execution engine 504 is then permitted automatically execute the respective chaos experiments on the respective landing zone.

Figure 6A:
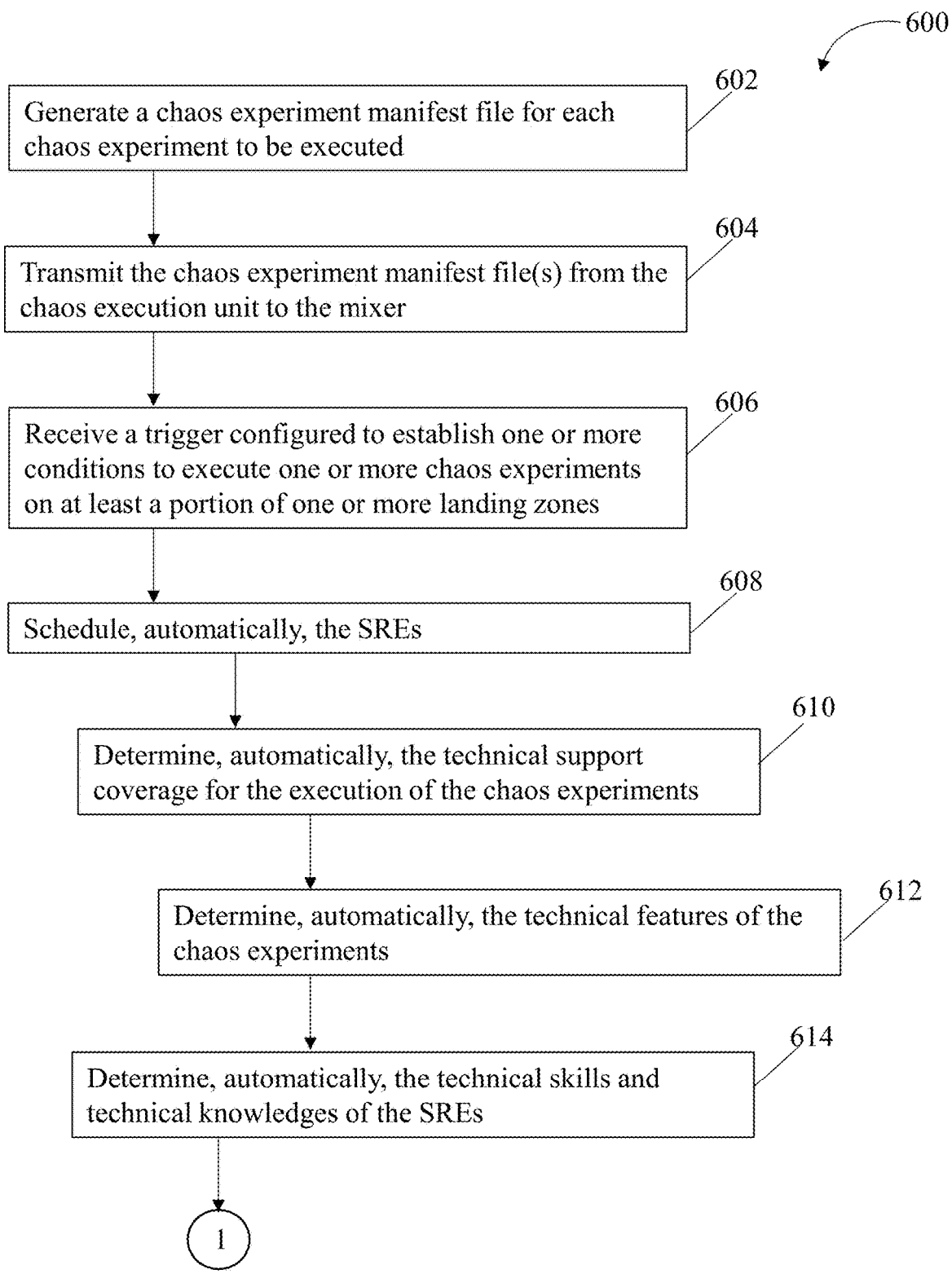
FIG. 6A is a flowchart illustrating a process for automatically executing chaos experiments on computing resources, applications, and services through automatically establishing and meeting core requirements for each chaos experiment, in accordance with some embodiments of the present disclosure.

Referring to FIG. 6A, a flowchart is provided illustrating a process 600 for automatically executing chaos experiments on computing resources, applications, and services through automatically establishing and meeting core requirements for each chaos experiment. Also referring to FIGS. 5A through 5C, the process 600 includes generating 602 a chaos experiment manifest file 506 for each chaos experiment to be executed within the chaos execution unit 502 and transmitting 604 the manifest file(s) 506 from the chaos execution unit 502 to the mixer 510. The necessary skills and knowledge expected of the SREs that will support execution of the chaos experiments associated with the respective manifest file 506 are declared within the manifest file 506. The mixer 510 also receives 606 from the chaos execution unit 502 the trigger 508 that is configured to establish one or more conditions to execute one or more chaos experiments on at least a portion of the one or more landing zones X, Y, and Z. Each chaos experiment is configured to operationally stress the one or more landing zones X, Y, and Z that are configured with one or more of one or more infrastructure resources 1-M, one or more services 1-N, and one or more computing applications 1-P.

In some embodiments, the SREs are automatically scheduled 608 for the respective chaos experiments. The automatic scheduling operation 608 includes determining 610, automatically, the technical support coverage necessary for the execution of the chaos experiments. As described above, the technical features, including the technical support requirements, are resident within the manifest file 506 that is transmitted to, and received by, the mixer 510. These technical features are determined 612, automatically, by the mixer 510 through parsing the technical features in the manifest file 506. The technical features of the chaos experiment to be executed as parsed from the determination operation 612 serve as a guide to the mixer 510 to determine 614, automatically, the technical skills and technical knowledge of the SREs. The assignments are based on selection criteria that includes, without limitation, skills and knowledge with respect to the landing zone, overall experience level as an on-call SRE, and knowledge of previous tests performed on this landing zone (that may be pulled from the post-experiment data 454).

Figure 6B:
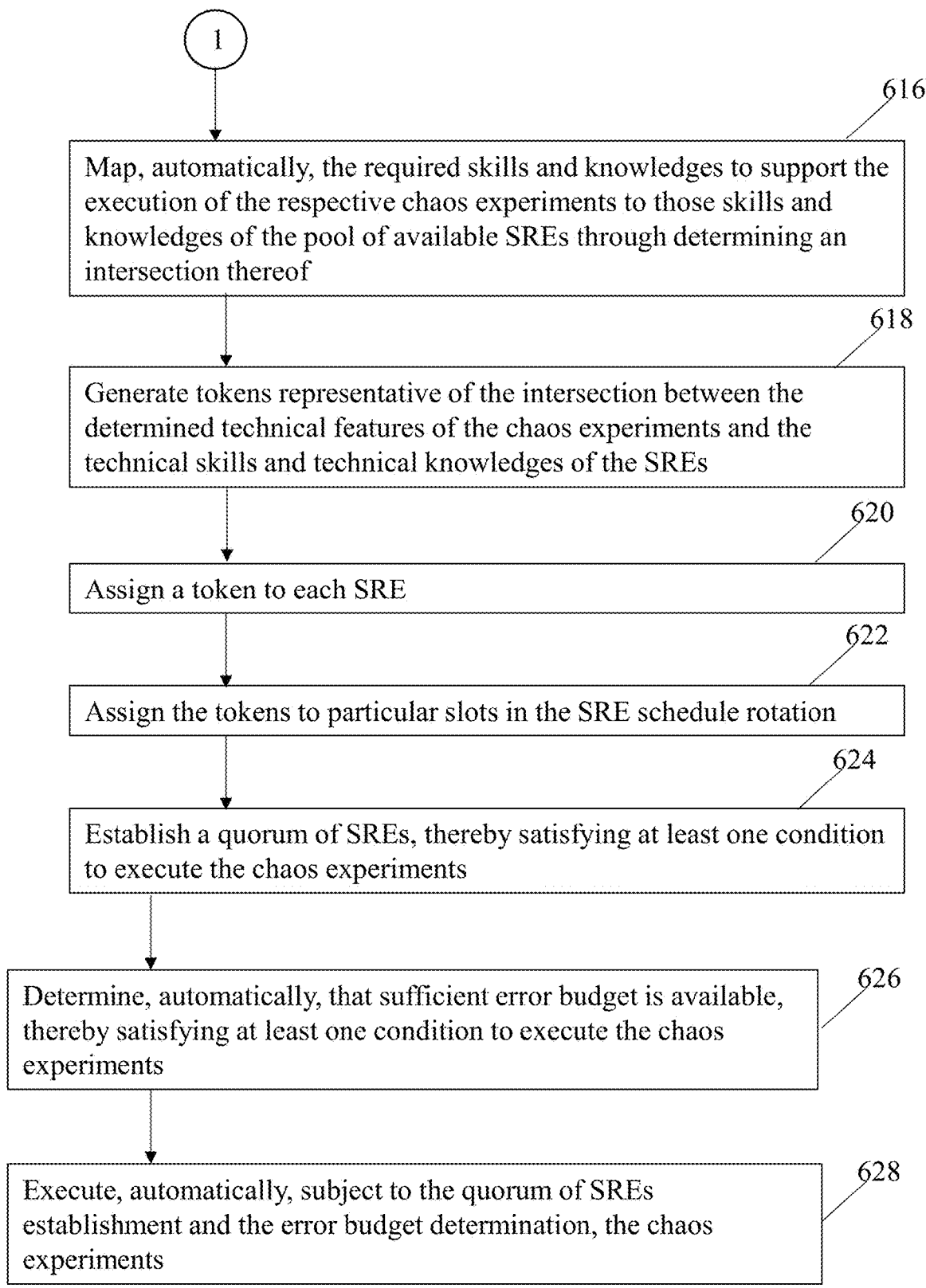
FIG. 6B is a continuation of the flowchart of FIG. 6A, in accordance with some embodiments of the present disclosure.

Referring to FIG. 6B, a continuation of the flowchart of FIG. 6A is provided. Continuing to refer to FIGS. 5A-5C and 6A, the process 600 maps 616 the required skills and knowledge to support the execution of the respective chaos experiments to those skills and knowledge of the pool of available SREs through determining an intersection thereof. The token unit 514 generates 618 the tokens. Specifically, the token unit 514 generates 618 tokens for each SRE assigned to the SRE testing team. The token unit 514 determines if each SRE on the team has been evaluated as previously described. If the evaluation for the respective SRE is completed, a token is generated 618. If the respective SRE did not meet the requirements through the token unit 514, the respective SRE will not be assigned any tokens for the portions of the testing that they did not qualify for. For those generated tokens, the token unit 514 assigns 620 the tokens to the appropriate SREs. The chaos quorum unit 516 assigns 622 the tokens to particular slots in the SRE schedule rotation based on when the skill sets are needed such that a quorum of SREs is established 624 through the chaos quorum unit 516 as previously described with respect to FIGS. 5B and 5C, thereby satisfying at least one condition to execute the one or more chaos experiments. For those instances where a quorum of technical support for a particular chaos experiment cannot be established, the test will not receive a decision 512 to execute. In some embodiments, the tokens may only be presented to the respective SREs as they sign into the test for a shift and the testing will be automatically allowed to proceed once the correct SREs and their assigned tokens have been accounted for. This feature is facilitated through providing each SRE a different token for each shift and may be further facilitated though invalidating respective tokens once the respective shift is over.

The process 600 also includes determining 626, automatically, through the error budget unit 518, that sufficient error budget is available for error remediation, thereby satisfying at least one condition to execute the chaos experiments. For those instances where sufficient error budget for a particular chaos experiment cannot be established, the test will not receive a decision 512 to execute. The process 600 further includes executing 628, automatically, subject to the SRE quorum establishment operation 624 and the error budget determination 626, the chaos experiments.

The system, computer program product, and method as disclosed herein facilitates overcoming the disadvantages and limitations of known systems, apparatus, and methods for automatically executing chaos experiments on computing resources, applications, and services through automatically establishing and meeting core requirements for each chaos experiment. Specifically, the systems and methods described herein facilitate fully automating a suite of chaos experiments for a landing zone while meeting core requirements of ensuring sufficient technical support coverage for each test of the suite of tests and ensuring that sufficient error budget remains to support any remediation efforts as a result of the particular tests. The system and method described herein maps the established technical support requirements of the chaos experiments to the established technical competencies of the team of SREs that will support the testing and determines an intersection of the requirements and the available skill sets. The methods of staffing the support for the chaos experiments facilitates sharing the technical details of the actual execution activities between SREs with similar skill sets by scheduling them together, at least occasionally, to support similar experiments. The methods of staffing the technical support for the chaos experiments facilitate staffing the support rotation with those SREs that are technically competent for that particular testing. The use of the token methods described herein facilitate executing the tests only when the proper staffing is set through mapping the individual tokens to specific SREs. The quorum scheduling described herein also facilitates better resource utilization through decreasing a reliance on any one individual. Also, as described herein, tests without the proper requirement s for technical support and recovery budget will not be executed until the core requirements are met.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
one or more processing devices and at least one memory device operably coupled to the one or more processing devices, the one or more processing devices being configured to:
automatically execute one or more chaos experiments to operationally stress-test at least one computing-resource object of one or more landing zones, each landing zone being a secure computing environment, and the one or more landing zones being configured with the one or more computing-resource objects, the one or more chaos experiments configured to operationally stress at least one of the one or more computing-resource objects, the automatically execute the one or more chaos experiments to operationally stress-test the at least one computing-resource object of the one or more landing zones comprising:
receiving a trigger signal configured to confirm one or more conditions to execute the one or more chaos experiments on at least a portion of the one or more landing zones;
based on receiving the trigger signal configured to confirm the one or more conditions, determine using a mixer unit of a chaos experiment tool that technical support coverage is available for the execution of the one or more chaos experiments; and
automatically executing using a chaos execution unit of the chaos experiment tool, subject to the determination using the mixer unit, the one or more chaos experiments to operationally stress-test the at least one computing-resource object of the one or more landing zones.

2. The system of claim 1, wherein the one or more processing devices are further configured to:
schedule, automatically, one or more technical support representatives.

3. The system of claim 2, wherein the one or more processing devices are further configured to:
determine, automatically, one or more technical features of the one or more chaos experiments; and
determine, automatically, subject to the determined one or more technical features, one or more of technical skills and technical knowledge of the one or more technical support representatives.

4. The system of claim 3, wherein the one or more processing devices are further configured to:
determine, automatically, one or more of the technical support representatives' participation with one or more previous chaos experiments on the one or more landing zones.

5. The system of claim 3, wherein the one or more processing devices are further configured to:
generate at least one token at least partially representative of an intersection between the determined one or more technical features of the one or more chaos experiments and the determined one or more of the technical skills and the technical knowledge of the one or more technical support representatives.

6. The system of claim 5, wherein the one or more processing devices are further configured to:
assign the at least one token to each technical support representative of the one or more technical support representatives.

7. The system of claim 6, wherein the one or more processing devices are further configured to:
establish a quorum of technical support representatives, thereby satisfying at least one condition to execute the one or more chaos experiments.

8. The system of claim 1, wherein the one or more processing devices are further configured to:
determine, automatically, that sufficient error budget is available, thereby satisfying at least one condition to execute the one or more chaos experiments.

9. A computer program product, the computer program product comprising:
one or more non-transitory computer readable storage media; and
program instructions collectively stored on the one or more non-transitory computer-readable storage media, the program instructions comprising:
program instructions to automatically execute one or more chaos experiments to operationally stress-test at least one computing-resource object of one or more landing zones, each landing zone being a secure computing environment, and the one or more landing zones being configured with the one or more computing-resource objects, the one or more chaos experiments configured to operationally stress at least one of the one or more computing-resource objects, the program instructions to automatically execute the one or more chaos experiments to operationally stress-test the at least one computing-resource object of the one or more landing zones comprising:
program instructions to receive a trigger signal configured to confirm one or more conditions to execute the one or more chaos experiments on at least a portion of the one or more landing zones;
program instructions to determine, using a mixer unit of a chaos experiment tool and based on receiving the trigger signal configured to confirm the one or more conditions, that technical support coverage is available for the execution of the one or more chaos experiments; and
program instructions to automatically execute, using a chaos execution unit of the chaos experiment tool, subject to the determination using the mixer unit, the one or more chaos experiments to operationally stress-test the at least one computing-resource object of the one or more landing zones.

10. The computer program product of claim 9, further comprising:
program instructions to schedule, automatically, one or more technical support representatives;
program instructions to determine, automatically, one or more technical features of the one or more chaos experiments; and
program instructions to determine, automatically, subject to the determined one or more technical features, one or more of technical skills and technical knowledge of the one or more technical support representatives.

11. The computer program product of claim 10, further comprising:
program instructions to generate at least one token at least partially representative of an intersection between the determined one or more technical features of the one or more chaos experiments and the determined one or more of the technical skills and the technical knowledge of the one or more technical support representatives;
program instructions to assign the at least one token to each technical support representative of the one or more technical support representatives; and
program instructions to establish a quorum of technical support representatives, thereby satisfying at least one condition to execute the one or more chaos experiments.

12. The computer program product of claim 9, further comprising:
program instructions to determine, automatically, that sufficient error budget is available, thereby satisfying at least one condition to execute the one or more chaos experiments.

13. A computer-implemented method comprising:
automatically execute one or more chaos experiments to operationally stress-test at least one computing-resource object of one or more landing zones, each landing zone being a secure computing environment, and the one or more landing zones being configured with the one or more computing-resource objects, the one or more chaos experiments configured to operationally stress at least one of the one or more computing-resource objects, the automatically execute the one or more chaos experiments to operationally stress-test the at least one computing-resource object of the one or more landing zones comprising:
receiving a trigger signal configured to confirm one or more conditions to execute the one or more chaos experiments on at least a portion of the one or more landing zones;
based on receiving the trigger signal configured to confirm the one or more conditions, determine using a mixer unit of a chaos experiment tool that technical support coverage is available for the execution of the one or more chaos experiments; and
automatically executing using a chaos execution unit of the chaos experiment tool, subject to the determination using the mixer unit, the one or more chaos experiments to operationally stress-test the at least one computing-resource object of the one or more landing zones.

14. The method of claim 13, wherein the determining technical support coverage comprises:
scheduling, automatically, one or more technical support representatives.

15. The method of claim 14, wherein the scheduling one or more technical support representatives comprises:
determining, automatically, one or more technical features of the one or more chaos experiments; and
determining, automatically, subject to the determined one or more technical features, one or more of technical skills and technical knowledge of the one or more technical support representatives.

16. The method of claim 14, wherein the scheduling one or more technical support representatives further comprises:
determining, automatically, one or more of the technical support representatives' participation with one or more previous chaos experiments on the one or more landing zones.

17. The method of claim 16, wherein the scheduling one or more technical support representatives further comprises:
- generating at least one token at least partially representative of an intersection between the determined one or more technical features of the one or more chaos experiments and the determined one or more of the technical skills and the technical knowledge of the one or more technical support representatives.

18. The method of claim 17, wherein the scheduling one or more technical support representatives further comprises:
- assigning the at least one token to each technical support representative of the one or more technical support representatives.

19. The method of claim 18, wherein the assigning the at least one token to each technical support representative comprises:
- establishing a quorum of technical support representatives, thereby satisfying at least one condition to execute the one or more chaos experiments.

20. The method of claim 13, further comprising:
- determining, automatically, that sufficient error budget is available, thereby satisfying at least one condition to execute the one or more chaos experiments.

\* \* \* \* \*